Aug. 17, 1965     R. B. JOHNSON     3,200,547

CORNER MOLDING

Filed July 1, 1963

INVENTOR.
ROBERT B. JOHNSON

BY Pauline Newman

ATTORNEY 3,200,547
CORNER MOLDING
Robert B. Johnson, Peekskill, N.Y., assignor to Standard Coated Products Incorporated, Buchanan, N.Y., a corporation of New York
Filed July 1, 1963, Ser. No. 291,760
3 Claims. (Cl. 52—288)

This invention relates to protective and decorative wall and corridor treatment, and is particularly concerned with an improved molding construction for use on angular surfaces of walls, corridors and the like.

The angular surfaces for which the novel molding of this invention is designed are normally formed by planar surfaces meeting at 90° angles, which will for convenience be called "inside corners," or by planar surfaces meeting at 270° angles, conveniently designated "outside corners." The molding of this invention is thus appropriately called a "corner molding."

My corner molding is useful on both inside and outside angular surfaces of rooms, corridors, doorways and the like, including surfaces of wall and floor or ceiling. Inside corners do not normally need protection from abusive contact in the same way as do outside corners, but an advantage of a corner molding which can be used interchangeably on either inside or outside corners is that a designer has the opportunity of providing a panelled or uniform decorative design throughout the building, as well as providing a functional molding wherever it is needed. Since the corner molding of this invention is flexible, it is equally usable if the sides of the corners are curved, either convex or concave, or if the angle at the corner is substantially more or less than 90°, varying within a range of 0° to 360°, for either inside or outside corners.

My corner moldings are particularly useful for protecting protruding corners in areas of heavy traffic, such as in institutions including hospitals, administrative buildings and factories, where carts and carriers are used for distribution of supplies, drugs, mail, etc., or where furniture is moved often; as well as in many areas of homes, such as children's rooms and recreation rooms, where wall or corridor corners are subject to wear or abuse. Other areas in which these corner moldings may be valuable include such corners as at elevator openings, where brief cases and hand-carried objects might strike the corners; at doorways, and any other projecting edge or corner which may be subject to abuse. These corner moldings are also useful to protect rough, unfinished corners, or to cover the parting line between surface coverings which meet at corners, and in many other applications. The corners to which these moldings are applied may be decorated or protected with wallpaper or coated fabric, with paint or other coating, or may be plaster, masonry, metal, or any other material of construction, finished or unfinished.

In my copending patent application Serial No. 272,705, filed April 12, 1963, is described a plastic molding strip for use on walls, to cover the parting line between wall coverings, or to protect walls and wall coverings from abuse at the levels of wear. Said molding strip was designed to replace the typical wooden moldings which are normally used for these purposes. However, standard wooden molding is not at all applicable for use around corners of walls, corridors, doorways and the like, and neither is the molding strip of Serial No. 272,705. The corner molding which I have now invented is designed for areas which were heretofore not susceptible to protection or decoration of this sort.

My new corner molding not only provides these previously unavailable advantages, but it is extremely simple to apply, and is applicable equally well to corners whose surfaces are characterized by irregularities or imperfections of construction or design, as well as to normally smooth surfaces. This molding is dimensionally stable to elastic stretch, and thus deformation of the molding during application, with subsequent elastic recovery and the formation of gaps at the ends or seams of the molding strips, is virtually eliminated, along with any resultant impairment of appearance. A tight bond and attractive appearance is obtained even on application to irregular wall surfaces, due to the conformability obtained from an inner layer of deformable plastic. For utilitarian purposes, the basic requirement in an outside corner molding is to protect the wall covering or wall surfaces from wear and abuse at protruding edges. The molding of this invention is made preferably of a tough, scuff-resistant plastic material, such as foamed vinyl plastic, so that the protection achieved is due both to the resistance of the foamed vinyl to scuffing and impact, and the high abrasive resistance of the plastic surface of the molding.

The purposes and advantages of my invention will become apparent from the subsequent detailed description and the accompanying drawing, in which.

Briefly, the novel corner molding construction of my invention comprises a laminar structure which is hinged to conform to the angular surfaces of the corner. The outer layer of said laminar structure is a normally flat, elongated member of semi-rigid but deformable plastic material. Along the inner surface of this member, in spaced relation to the edges thereof and normally equidistant from these edges, is a V-shaped groove, running the entire length of the outer member of the molding construction. This groove forms the corner hinge of the molding. On both sides of this groove, disposed on the inner surface of the outer member and substantially filling this inner surface, is an interior layer of substantially deformable foamed plastic material, which interior layer is discontinuous at the line of said V-shaped groove, providing an open recess on each side of the groove. The outer and interior members are permanently bonded to each other by an adhesive layer, and the interior layer carries on its innermost surface a layer of a normally tacky pressure-sensitive adhesive material, with which it is ultimately bonded to the surfaces of the corner. Before application to the corner, a removable sealing or protecting sheet is disposed over the exposed surface of the pressure-sensitive adhesive. The outer member of the molding has inturned flanged edges which enclose peripherally the interior members, which flanges extend beyond the plane of the interior members, so that on application to the corner surfaces, the flanges are deformed to provide firm external contact of the outer member with the angular wall surfaces. In a preferred embodiment the outer and interior members are constructed of foamed plastic, and the V-shaped groove at the line at which the hinge is desired is conveniently provided by collapsing the foamed plastic outer layer on its inner surface along the desired line. Said groove should be sufficiently deep to provide the necessary flexibility, without weakening the construction. The molding may be bent either inwardly or outwardly, and in either case provides a smooth hinge along the line of the groove.

Figure 1:
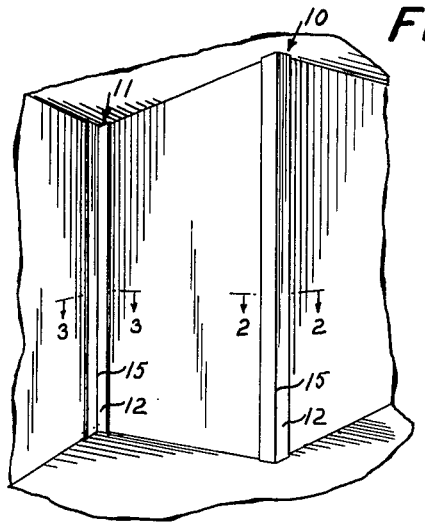
FIGURE 1 is a perspective view of walls showing my new corner molding.
Figure 2:
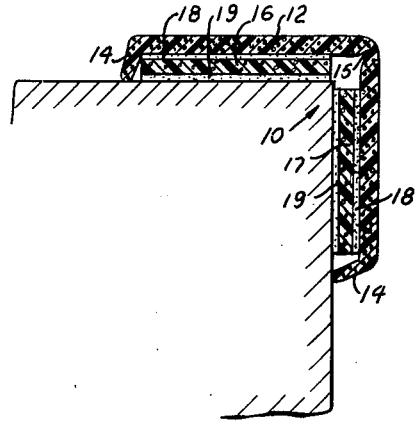
FIGURE 2 is a sectional detail view showing the molding applied to an outside corner, taken on line 2—2 of FIGURE 1.
Figure 3:
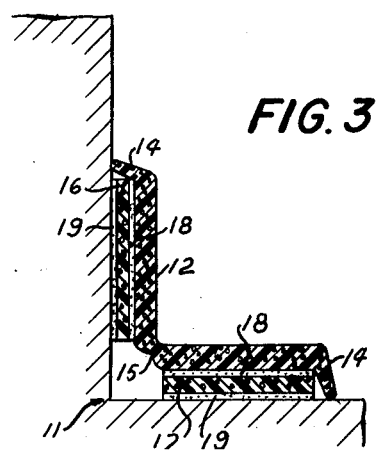
FIGURE 3 is a sectional detail view showing the molding applied to an inside corner, taken on line 3—3 of FIGURE 1.

Referring to FIGURE 1, the angular surfaces to which the molding of this invention is applied are illustrated by both outside corners 10 as shown in detail in FIGURE 2, or inside corners 11, as shown in detail in FIGURE 3. Such corners are ordinarily right angles, and are illustrated as such, but the molding of this invention is equally well adapted to be used on angular surfaces which meet at angles substantially more or less than 90°, ranging from virtually flat surfaces to acute angles as the molding sides are bent at the hinge through 90° in either direction. Thus, the word "corner" is intended to comprehend angular surfaces which meet at angles other than 90°, and as discussed above these corners may be those of walls, corridors, doorways, panelling, shelves and the like.

Figure 4:
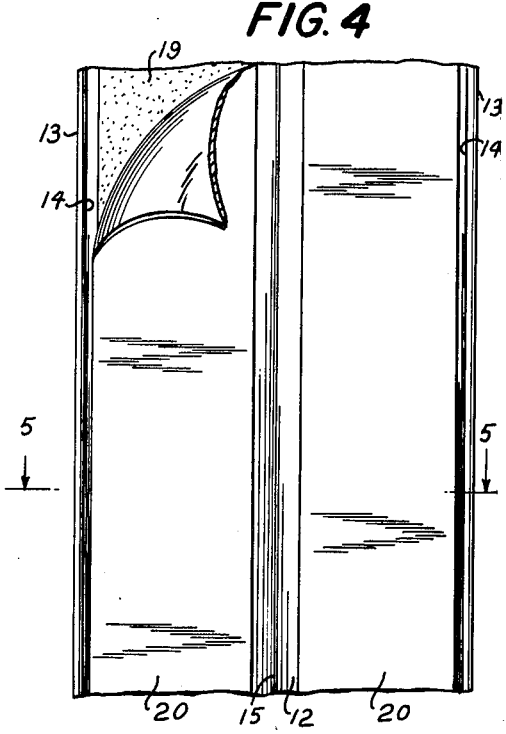
FIGURE 4 is a bottom plan view of a corner molding constructed according to this invention.
Figure 5:
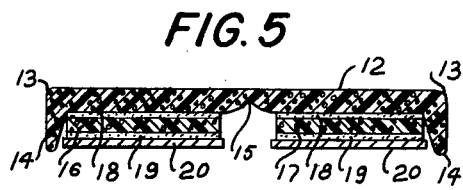
FIGURE 5 is a cross-section of the molding of this invention, taken on line 5—5 of FIGURE 4.

As seen in FIGURE 4, and in section in FIGURES 2, 3 and 5, the article comprises a laminar structure having an outer member 12 which is an elongated strip of deformable plastic composition having parallel edges 13 and inturned flanges 14 terminating each parallel edge. These flanges preferably form about a right angle with the plane of the outer member, as shown in FIGURE 5, and extend inwardly to a plane even with or preferably slightly beyond the plane of the entire laminar structure. Thus, when the article is affixed to corners, as illustrated in FIGURES 2 and 3, the inwardly extending flanges are deformed into firm sealing contact with the surfaces of the corners.

The outer member 12 carries a V-shaped groove 15 on its inner surface along its entire length, parallel with the edges 13 of said outer member and in spaced relation thereto, normally equidistant from said edges, although the groove may if desired be off center, to provide greater protection along one side of the angular surface than the other. This groove may be formed in the outer member in a variety of ways; for example, during extrusion of the outer member, from the design of the extrusion die; or by using a V-shaped heating device, after forming the outer member of foamed vinyl or other plastic, to collapse the foam in order to form the hinge at the desired line (this is a preferred procedure, since a very tough thin hinge of collapsed vinyl is formed, around which the molding is readily bent). Alternatively, the groove may be cut with a sharp V-shaped tool, which removes a section of the plastic material; is such case, enough resin must be retained to provide the strength necessary to avoid tearing at the hinge. The size and shape of the groove which acts as hinge is such that the angle of the sides of the groove permit the molding to be either bent back on itself to form a tight inside corner, or to open up to fit snugly at the desired angle around an outside corner.

The grooved inner face of the outer member 12 carries on it two interior members 16 and 17, disposed in the recess between the flanges 14 and in spaced relation thereto, and separated from each other by the groove 15 and in spaced relation to said groove, whereby bending the outer member at said groove is readily achieved without interference from the interior members. The flanges 14 enclose peripherally said interior members but the flanges themselves are free of contact with the interior members and overhang and extend inwardly to a plane even with or slightly beyond the plane of the interior members.

The interior members 16 and 17 are resilient, conformable foamed plastic strips. They are adhered by an adhesive layer 18 to the outer member 12. This adhesive layer may be any adhesive effective to bond plastic members, including pressure-sensitive adhesive. The inner face of these interior members, after bonding to the outer member, carries a coating of normally tacky pressure-sensitive adhesive 19, for adhesion in use, when applied with simple pressure to the surfaces of the corner.

As illustrated in FIGURES 4 and 5, the surfaces of the adhesive layers 19 are covered, before the construction is applied to a corner, without removable sealing sheets 20, such as paper or cellophane, to maintain and protect the normally tacky and pressure-sensitive condition of the adhesive. The interior surface of the entire construction after removal of the sealing sheets lies, as stated above, in a plane which lies within the plane connecting the tips of the flanges 14; that is, the plane joining the edges of the flanges protrudes beyond the adhesive surface on the interior members.

The outer member 12 should be deformably thin in the regions of the flanges 14; the balance of the molding may be of any cross-section, but is preferably thin and uniform. When the molding is applied to a corner, the sealing sheets 20 are stripped off and the molding is simply pressed to the corner surfaces. Adhesion is obtained at the pressure-sensitive adhesive layers 19, and the foamed inner members 16 and 17 conform to and provide firm contact even with irregular surfaces. The overhanging flanges 14 are deformed outwardly, as shown in FIGURES 2 and 3, into sealing contact with the wall surfaces. These tight contact planes act to seal the molding edges, and retard the action of air and other destructive agencies on the adhesive, thereby extending the life of the molding.

The outer member of this laminar structure may be of any semirigid material which is sufficiently deformable to be bent at the grooved hinge and at the flanged edges, and is preferably constructed of a foamed, plasticized resin, preferably a vinyl or other resin having a tough, resistant surface. The interior members are preferably more resilient and deformable than the outer member, in order to conform to any irregularities in the surfaces to which these members are adhered. The interior and outer members may be made by casting or extruding plastisol compositions comprising resinous particles, a blowing agent, and a suitable plasticizer, adjusting the ingredients to provide the desired cellular structure, flexibility, and other characteristics as set forth herein. Other ingredients may also be compounded with the plastisol, such as coloring agents, stabilizers, fillers, flame retardants, and the like.

In the preferred embodiment of this invention, the outer member 12 is constructed of a more rigid, denser foamed material than the interior members 17 and 18, which are preferably more porous and flexible, for optimum conformability to minor irregularties in the surfaces to which the molding is adhered. In practice the interior members should be at least about $\frac{1}{16}$ inch thick, the thickness limited for reasons of economy, appearance, and design, and may be fabricated of any of the resins previously described, with appropriate plasticizers and other additives, and foamed by standard procedures, to produce a foamed material of the desired properties. The thin cross section of the interior members shown in the drawings is preferred for its obvious economy of materials. The outer member 12 obviously need not be of the very thin cross section shown except at the region of the flanged edges 13. The main body of the molding could be of arcuate cross section, corrugated, or otherwise decorated.

In similar fashion, the resin composition of the members could widely varied. Similarly, the strips can be used flat as well as at corners, for a wide variety of decorative and functional purposes. These and other modifications can be made in the specific embodiment of the invention illustrated, without departing from the scope of the invention, as represented in the following claims:

What is claimed is:

1. In combination with an angular surface, an elongated hinged plastic molding bridging the abutting edges of said angular surface and overlying the adjacent portions thereof, said hinged plastic molding comprising a laminar structure having a hinged outer member of deformable foamed plastic and interior members, said outer member having inturned flanges at the edges thereof and a recess between the flanges; a hinge comprising a V-shaped groove running the length of said outer member, parallel with and in spaced relation to the edges of the outer member, said groove disposed on the inner face of the outer member and forming said hinge around which the molding is bent; a pair of interior members of deformable foamed plastic in adhesive contact with the recess on either side of the hinge and periphery enclosed by said flanges; and an adhesive on the surfaces of the interior members whereby said members are adhered to the adjacent portions of the angular surface as the molding is bent at the hinge, and said flanges are in firm contact with the adjacent portions of the angular surface.

2. A molding for application to angular surfaces, comprising a hinged laminar structure having an outer member of deformable foamed plastic and inturned deformable flanges at the edges thereof and a recess between the flanges; a V-shaped groove running the length of said outer member, parallel with and in spaced relation to the edges of the outer member, said groove disposed on the inner face of the outer member and forming a hinge around which the molding may be bent; a pair of interior members of deformable foamed plastic disposed in the recess between the flanges and peripherally enclosed thereby, said recess being filled to less than its depth by said interior members, such that said flanges overhang beyond the plane of said interior members; said interior members being separated by said groove and adhered to the recess between the flanges by a layer of adhesive material; a layer of a normally tacky pressure-sensitive adhesive material disposed on the inner surfaces of the interior members; and a removable sealing sheet disposed over said pressure-sensitive adhesive layer in sealing engagement, whereby said adhesive layer is completely enclosed for maintaining its normally tacky and pressure-sensitive condition before use of the article, said sealing sheet being releasable from said adhesive layer to expose the same for adhering said molding to angular surfaces by application of pressure, whereby said flanges are deformed to provide firm contact with said angular surfaces.

3. A molding for application to angular surfaces, comprising a hinged laminar structure having an outer member of deformable foamed vinyl plastic having a generally planar outer surface and deformable flanges at the edges thereof and a recess between the flanges; a V-shaped groove running the length of said outer member, parallel with and in spaced relation to the edges of the outer member, said groove disposed on the inner face of the outer member and forming a hinge around which the molding may be bent; a pair of interior members of deformable foamed plastic disposed in the recess between the flanges and peripherally enclosed thereby, said recess being filled to less than its depth by said interior members, such that said flanges overhang beyond the plane of said interior members; said interior members separated by said groove and adhered to the recess between the flanges by a layer of adhesive material; a layer of a normally tack pressure-sensitive adhesive material disposed on the surfaces of the interior members; and a removable protecting sheet disposed over said pressure-sensitive adhesive layer in sealing engagement, whereby said adhesive layer is completely enclosed for maintaining its normally tacky and pressure-sensitive condition before use of the article, said sealing sheet being releasable from said adhesive layer to expose the same for adhering said molding to angular surfaces by application of pressure, whereby said overhanging flanges are deformed to provide firm contact with said surface.

References Cited by the Examiner

UNITED STATES PATENTS

| | | | |
|---|---|---|---|
| 2,057,873 | 10/36 | Atwood | 161—406 X |
| 2,643,423 | 10/53 | Brendel | 20—74 |
| 2,791,527 | 5/57 | Gawrysiak | 20—74 X |
| 2,831,049 | 4/58 | Cabral | 20—74 X |
| 2,867,864 | 1/59 | Githens | 20—74 X |

HARRISON R. MOSELEY, *Primary Examiner.*

REINALDO P. MACHADO, *Examiner.*